US011320482B2

(12) United States Patent
Srivastava et al.

(10) Patent No.: US 11,320,482 B2
(45) Date of Patent: May 3, 2022

(54) SECURE SCAN ENTRY

(71) Applicant: Silicon Laboratories Inc., Austin, TX (US)

(72) Inventors: Mudit Srivastava, Singapore (SG); Raghavendra Pai Kateel, Singapore (SG); HengWee Cheng, Singapore (SG); Anil Shirwaikar, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 17 days.

(21) Appl. No.: 16/801,447

(22) Filed: Feb. 26, 2020

(65) Prior Publication Data

US 2021/0263098 A1 Aug. 26, 2021

(51) Int. Cl.
*G01R 31/3177* (2006.01)
*G01R 31/317* (2006.01)
*G06F 21/74* (2013.01)
*G01R 31/327* (2006.01)

(52) U.S. Cl.
CPC ... *G01R 31/3177* (2013.01); *G01R 31/31701* (2013.01); *G06F 21/74* (2013.01)

(58) Field of Classification Search
None
See application file for complete search history.

(56) References Cited

U.S. PATENT DOCUMENTS

| | | | | |
|---|---|---|---|---|
| 7,155,643 | B2 * | 12/2006 | Ichikawa | G11C 29/44 714/710 |
| 8,040,153 | B1 * | 10/2011 | O'Dwyer | H03M 9/00 326/39 |
| 2002/0184584 | A1 * | 12/2002 | Taniguchi | G01R 31/318555 714/726 |
| 2004/0153801 | A1 * | 8/2004 | Kayukawa | G01R 31/318536 714/30 |
| 2006/0236182 | A1 * | 10/2006 | Xiang | G01R 31/31701 714/734 |
| 2007/0226562 | A1 | 9/2007 | Tkacik et al. | |
| 2008/0270859 | A1 * | 10/2008 | Mikami | G01R 31/31858 714/731 |
| 2009/0187801 | A1 * | 7/2009 | Pandey | G01R 31/318558 714/729 |
| 2010/0223519 | A1 * | 9/2010 | Swoboda | G01R 31/318544 714/733 |
| 2011/0113286 | A1 * | 5/2011 | Takasuka | G11C 29/848 714/E11.169 |

(Continued)

*Primary Examiner* — April Y Blair
*Assistant Examiner* — Dipakkumar B Gandhi
(74) *Attorney, Agent, or Firm* — Nields, Lemack & Frame, LLC

(57) ABSTRACT

An integrated circuit having a secure domain is disclosed. Circuitry within the integrated circuit is used to select one of a plurality of scan modes. The sequence used to select one of the scan modes also serves to reset all of the flip-flops in the secure domain. In this way, it is impossible for a hacker to use the test modes to shift data from the secure domain out of the integrated circuit. The reset is generated asynchronously upon assertion of a first signal and is terminated upon the assertion of a second signal. The assertion of the second signal also serves to select one of the scan modes. This system cannot be hacked by any method that enters scan mode since it is a hardware based solution.

19 Claims, 5 Drawing Sheets

(56) References Cited

U.S. PATENT DOCUMENTS

| | | | | |
|---|---|---|---|---|
| 2013/0111285 A1* | 5/2013 | Chakravarty | .. | G01R 31/318541 |
| | | | | 714/726 |
| 2015/0074477 A1* | 3/2015 | Bheemanna | ... | G01R 31/318575 |
| | | | | 714/727 |
| 2017/0089978 A1* | 3/2017 | Hao | ............... | G01R 31/318536 |
| 2019/0384735 A1* | 12/2019 | Schmitz | .................... | F21S 4/24 |

* cited by examiner

SECURE SCAN ENTRY

FIELD

Embodiments of the present disclosure relate to a system and method for performing scan tests on a semiconductor device with a secure domain.

BACKGROUND

Semiconductor devices have grown in terms of number of gates and storage elements. For example, a system on a chip (SoC) device may have millions of gates. Furthermore, recently, there has been a trend to incorporate a secure domain in these devices. A secure domain is a part of the semiconductor device that contains secret information that is not intended to be extracted from the device. This information may include a cryptographic logic, keys, and other similar information.

To test these semiconductor devices, typically scan chains are created in the device. When in scan mode, the output of one flip-flop is coupled to the input of another flip-flop. This is repeated many times to form one or more scan chains. Thus, in this scan mode, the scan chain may be a shift register, where data can be loaded into the scan chain from one end and extracted from the opposite end. One end of the scan chain may be connected to an external input pin, while the other end of the scan chain may be connected to an external output pin. In some current systems, there may be multiple internal scan chains which are connected in parallel to the external input pin and external output pin through multiplexing and demultiplexing.

To test the semiconductor device, the device is placed in the scan mode and a particular sequence may be loaded into these flip-flops via the one or more external input pins. Having loaded a particular state into the semiconductor device, the device is then allowed to operate in its normal mode for one or more clock periods. The semiconductor device is then returned to the scan mode, and the state of all of the flip-flops may be extracted via one or more external output pins.

This scan mode is complicated by the presence of secure domain. For example, if a semiconductor device is placed in scan mode and simply allowed to output the state of its flip-flops, potentially confidential information, such as cryptographic keys that are stored in flip-flops in the secure domain, may be extracted.

In certain cases, this situation is avoided by excluding the secure domain from the scan chains. However, as more and more functionality is added to these semiconductor devices, it is simply not practical to exclude a section of the device from testing.

Therefore, it would be beneficial if there was a system and method to include the secure domain in the scan chains while eliminating the possibility that confidential information is extracted from the device.

SUMMARY

An integrated circuit having a secure domain is disclosed. Circuitry within the integrated circuit is used to select one of a plurality of scan modes. The sequence used to select one of the scan modes also serves to reset all of the flip-flops in the secure domain. In this way, it is impossible for a hacker to use the test modes to shift data from the secure domain out of the integrated circuit. The reset is generated asynchronously upon assertion of a first signal and is terminated upon the assertion of a second signal. The assertion of the second signal also serves to select one of the scan modes. This system cannot be hacked by any method that enters scan mode since it is a hardware based solution.

According to one embodiment, an integrated circuit is disclosed. The integrated circuit comprises a secure domain, comprising flip-flops that contain confidential or proprietary information, a scan configuration circuit that selects a desired test mode configuration; a SCAN_TEST_EN signal that denotes that the integrated circuit is in a test mode; a SCAN_TST_UPD signal that is used to store the desired test mode configuration in the scan configuration circuit; and a secure domain protection circuit, wherein the secure domain protection circuit issues a reset to the flip-flops in the secure domain during a time interval between an assertion of the SCAN_TEST_EN signal and an assertion of the SCAN_TST_UPD signal. In certain embodiments, the assertion of the SCAN_TEST_EN signal causes the secure domain protection circuit to issue the reset. In certain embodiments, the assertion of the SCAN_TST_UPD signal causes the secure domain protection circuit to terminate the reset. In some embodiments, the SCAN_TST_UPD signal is an external connection. In certain embodiments, the scan configuration circuit comprises a scan configuration shift register and a scan configuration shadow register, wherein the SCAN_TEST_UPD signal is used to clock data from the scan configuration shift register to the scan configuration shadow register. In certain embodiments, the integrated circuit further comprises a SCAN_IN signal and a SCAN_CLK signal, wherein data is input to the scan configuration shift register via the SCAN_IN signal and the data is clocked into the scan configuration shift register by the SCAN_CLK signal. In some embodiments, the scan configuration shift register has a plurality of shift register flip-flops and the scan configuration shadow register comprises the same plurality of shadow register flip-flops, wherein an output of each of the plurality of the shift register flip-flops is an input to a corresponding shadow register flip-flop. In certain embodiments, the reset is issued asynchronously.

According to another embodiment, an integrated circuit is disclosed. The integrated circuit comprises a secure domain, comprising flip-flops that contain confidential or proprietary information, a first signal that denotes that the integrated circuit is in a test mode; a second signal; and a secure domain protection circuit, wherein the secure domain protection circuit issues a reset to the flip-flops in the secure domain during a time interval between an assertion of the first signal and an assertion of the second signal. In certain embodiments, the assertion of the first signal causes the secure domain protection circuit to issue the reset. In certain embodiments, the assertion of the second signal causes the secure domain protection circuit to terminate the reset. In some embodiments, testing cannot be performed until after the assertion of the second signal. In certain embodiments, the second signal is used to capture a mode of testing to be performed. In some embodiments, the second signal comprises an external connection. In certain embodiments, the first signal is an output of an internal flip-flop. In some embodiments, the internal flip-flop is set by an on-chip debugger using single wire debug (SWD) mode. In some embodiments, the first signal comprises an external connection.

BRIEF DESCRIPTION OF THE FIGURES

For a better understanding of the present disclosure, reference is made to the accompanying drawings, which are incorporated herein by reference and in which.

DETAILED DESCRIPTION

As described above, a system and method for scanning a semiconductor device having a secure domain without allowing confidential information to be extracted is disclosed.

Figure 1:
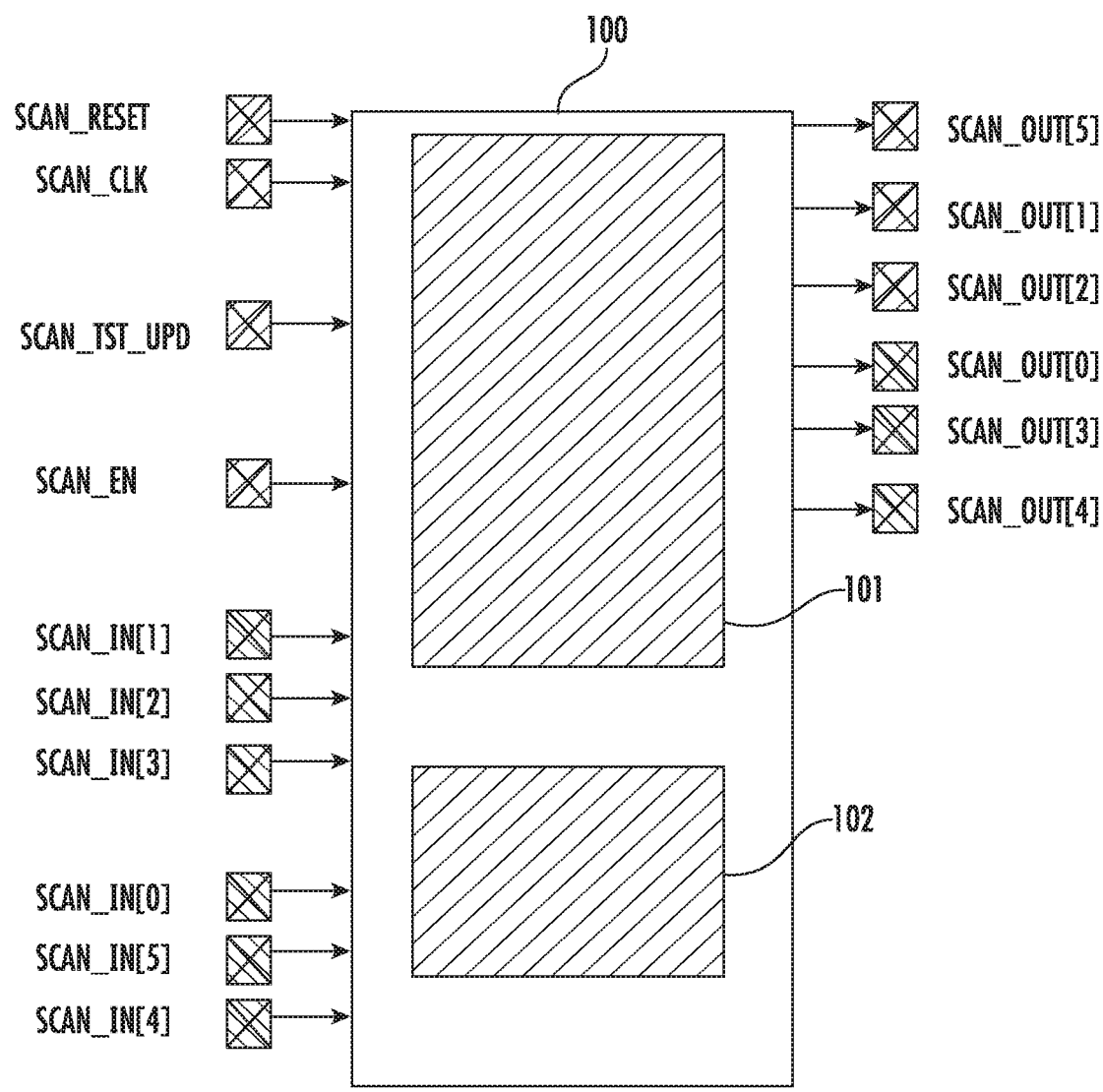
FIG. 1 shows the external connections for a semiconductor device that implements the disclosed system according to one embodiment.

FIG. 1 shows an integrated circuit 100 with the external connections associated with the scan mode according to one embodiment. In this embodiment, there are six separate scan chains, each having an external connection associated with its input and an external connection associated with the output. In this particular embodiment, these external connections are referred to as SCAN_IN[5:0] and SCAN OUT [5:0], respectively. Note that fewer or additional scan chains may be implemented in the integrated circuit 100. In fact, as few as one scan chain may be employed.

Additionally, there may be a SCAN RESET signal, which is used to reset all of the flip-flops in the integrated circuit 100 when in scan mode. Further, there may be a SCAN_CLK signal. This signal is the clock signal for all of the flip-flips in the integrated circuit 100 when in scan mode.

There is a scan shift enable signal, referred to as SCAN EN. This signal must be asserted to enable the patterns to be shifted during scan mode. This signal is set to 0 during capture mode.

Finally, there is a scan test update signal, SCAN_TST_UPD. The function of this signal is described in more detail below.

The present integrated circuit 100 is capable of employing a plurality of different scan modes. The scan mode to be implemented by the integrated circuit 100 is determined using the SCAN_IN[0] signal, the SCAN_CLK signal and the SCAN_TST_UPD signal. The scan mode selection is based on a shift and update configuration, as described below.

The integrated circuit 100 has two separate domains. The first is the operating domain 101, which includes most of the circuitry within the integrated circuit 100. The second is the secure domain 102. As described above, the secure domain 102 is the part of the integrated circuit 100 that contains secret or proprietary information that is not intended to be extracted from the integrated circuit 100. This information may include a cryptographic logic, keys, and other similar information.

Figure 2:
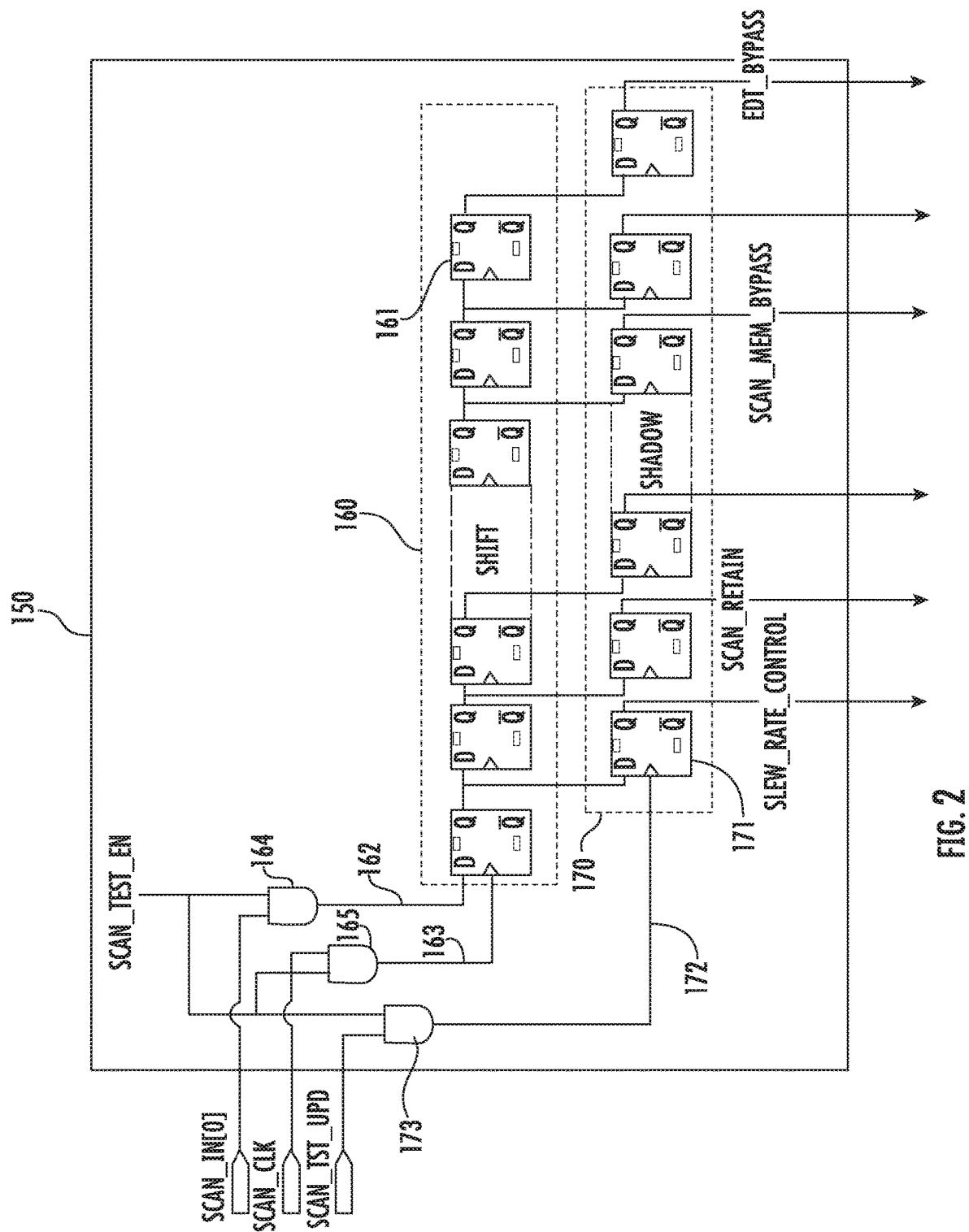
FIG. 2 shows a schematic showing the shift registers and shadow registers associated with the scan mode according to one embodiment.

As shown in FIG. 2, disposed within the integrated circuit 100 is a scan configuration circuit 150. This scan configuration circuit 150 may be disposed in the operating domain 101. The scan configuration circuit 150 comprises a scan configuration shift register 160 and a scan configuration shadow register 170.

The scan configuration shift register 160 comprises a plurality of shift register flip-flops 161 arranged in series. In other words, the output of each shift register flip-flop 161 (except the last flip-flop) serves as the input to the next flip-flop. In this way, data can be shifted into the scan configuration circuit 150 by presenting data at the input to the first scan configuration shift register flip-flop and allowing the data to propagate through the scan configuration shift register 160.

More particularly, the scan configuration circuit 150 is only operational if the integrated circuit 100 is in scan test mode. This may be determined based on the state of a signal labeled SCAN_TEST_EN. In certain embodiments, this signal is the output of an internal flip-flop, which may be set by an on-chip debugger using single wire debug (SWD) mode. Of course, this signal may be set using other mechanisms. For example, an external pin may be dedicated to this function. Alternatively, it may be set by the Test Data Register in JTAG/IJTAG mode.

The scan configuration shift register 160 has two inputs, a data input 162 and a clock signal 163. In certain embodiments, the data input 162 is created by the logical AND of the SCAN_TEST_EN signal and the SCAN_IN[0] signal, such as through the use of AND gate 164. In this way, if scan mode is not enabled, the data input 162 is always zero. Further, it is noted that while the present example utilizes the SCAN_IN[0] signal, any of the SCAN_IN signals may be used. Furthermore, if desired, a dedicated external connection may be used to load the scan configuration shift register 160.

Additionally, in certain embodiments, the clock signal 163 is created by the logical AND of the SCAN_TEST_EN signal and the SCAN_CLK signal, such as through the use of AND gate 165. Again, in this way, if scan mode is not enabled, there are no transitions on the clock signal 163 to the scan configuration shift register 160.

The scan configuration shadow register 170 comprises a plurality of shadow register flip-flops 171, where the number of flip-flops in the scan configuration shadow register 170 may be equal to the number of flip-flops in the scan configuration shift register 160. In this way, the output of each shift register flip-flop 161 in the scan configuration shift register 160 is the input to a respective one of the shadow register flip-flops 171 in the scan configuration shadow register 170. The scan configuration shadow register 170 also has another input, a clock signal 172. In certain embodiments, the clock signal 172 is created by the logical AND of the SCAN_TEST_EN signal and the SCAN_TST_UPD signal, such as through the use of AND gate 173. In other words, when in test mode, when the SCAN_TST_UPD signal is toggled, a new value is loaded from the scan configuration shift register 160 into the scan configuration shadow register 170. Each bit in the scan configuration shadow register 170 may represent a particular scan mode. Examples of different scan modes include Stuck-at;
At-speed;
Internal chain bypass stuck-at;
internal chain bypass at-speed;
scan retention test (SCAN_RETAIN);
Stuck-at Ram sequential; and others.

Additionally, the bits in the scan configuration shadow register 170 may also include some configuration settings used with different scan tests like some static settings for GPIO slew rate(SLEW_RATE_CONTROL), shut-down some internal clocks, bypass EDT(EDT_BYPASS), bypass RAMS 23(SCAN_MEM_BYPASS) and others.

Figure 3:
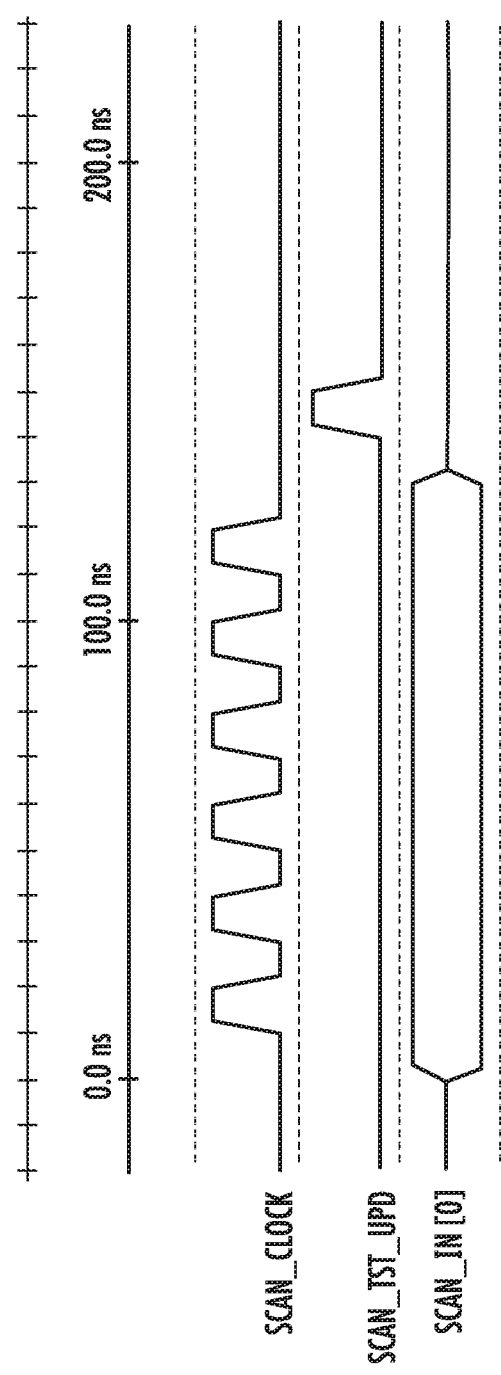
FIG. 3 shows a timing diagram showing the loading of a configuration mode according to one embodiment.

FIG. 3 shows a timing diagram illustrating the operation of the scan configuration circuit 150. In this figure, although not shown, it is assumed that the SCAN_TEST_EN signal is asserted. The SCAN_IN[0] signal represents the data that is to be loaded into the scan configuration shift register 160. Each time the SCAN_CLK toggles, new data enters the scan configuration shift register 160 and all previously entered data is shifted to the adjacent flip-flop in the scan configuration shift register 160. When the desired value has been loaded into the scan configuration shift register 160, the SCAN_TST_UPD signal is toggled. This causes the value currently in the scan configuration shift register 160 to be loaded into the scan configuration shadow register 170. The integrated circuit 100 may then be operated in the selected scan mode.

The sequence described above may also be used to ensure that no proprietary or confidential information is extracted from the secure domain 102 in the integrated circuit 100 during the scan test. Specifically, in one embodiment, all of the flip-flops in the secure domain 102 may be reset during at least a portion of the time interval between the start of the test mode and the assertion of the SCAN_TST_UPD signal. Additionally, secure memory cells containing sensitive information are not reset, but the read and write access to the memory is disabled upon entry to scan mode.

In this way, it is guaranteed that all of the confidential and proprietary information that may be contained in the secure domain 102 is erased prior to the start of the scan mode.

Figure 4:
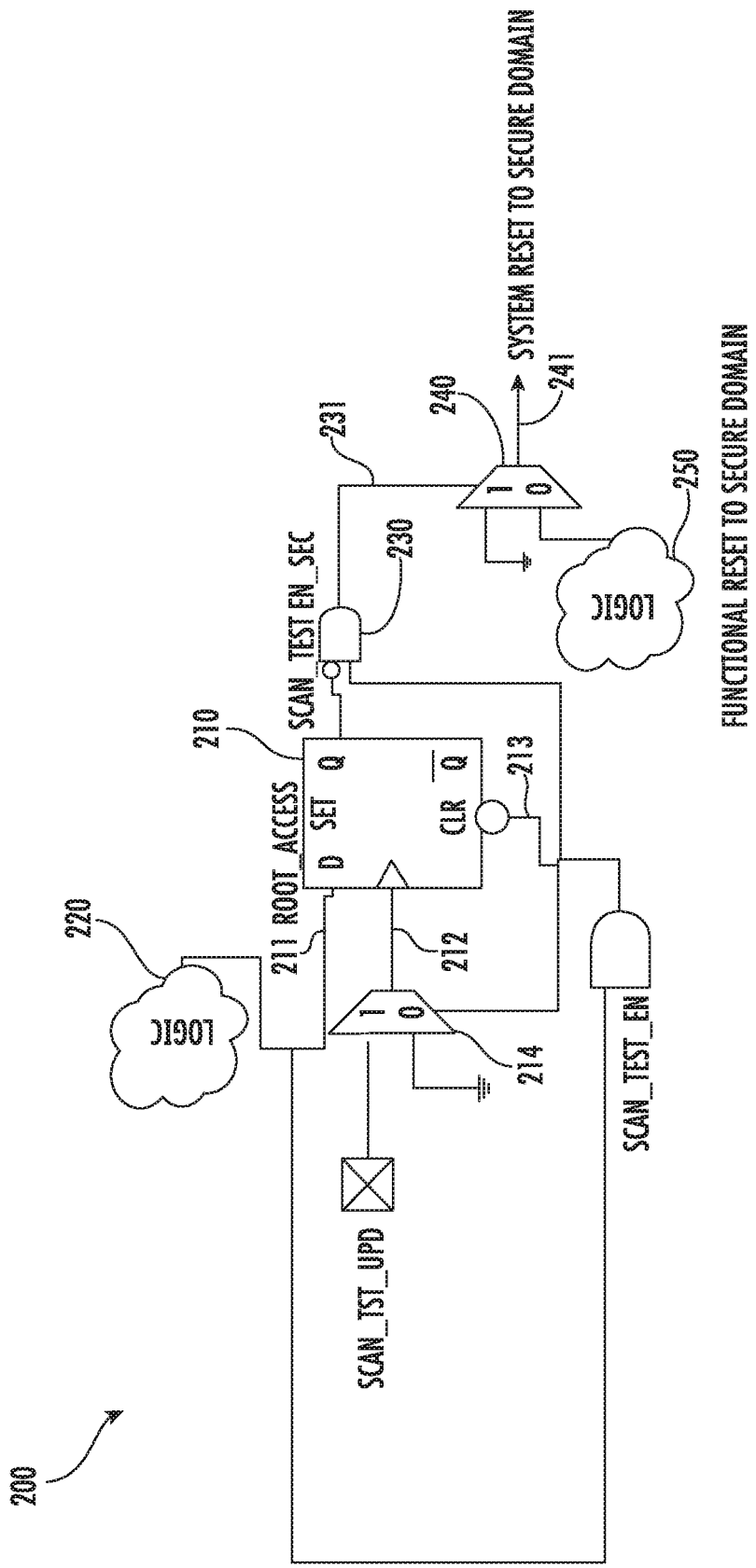
FIG. 4 shows a circuit that may be used to control the reset to the flip-flops in the secure domain according to one embodiment.

FIG. 4 shows a secure scan management circuit 200 that may be used to implement this functionality. This secure scan management circuit 200 includes a secure domain protection flip-flop 210 that is used to store the state of the root-access signal. This root-access signal is used, in conjunction with other logic, to determine whether all of the flip-flops in the secure domain 102 should be reset.

This secure domain protection flip-flop 210 has three inputs; a data input 211, a clock input 212 and a clear input 213. The clear input 213 is asserted low to reset the secure domain protection flip-flop 210 asynchronously. This secure domain protection flip-flop 210 is reset whenever the integrated circuit 100 is not in test mode, as determined by the signal SCAN_TEST_EN. Further, when the integrated circuit 100 is not is test mode, the clock input 212 to the secure domain protection flip-flop 210 is also grounded, thus ensuring that no data can be input to the secure domain protection flip-flop 210. Specifically, the clear input 213 may also be used as the select signal for multiplexer 214 to ensure that the clock input 212 is held at ground. Of course, other circuitry may be used to achieve this functionality.

In certain embodiments, there may be secure access grant generator logic 220. This secure access grant generator logic 220 is a sequence of logic used to unlock the integrated circuit 100 and enter scan mode. The secure access grant generator logic 220 generates a root_access signal, which permits access to the secure domain 102. This signal is the data input to secure domain protection flip-flop 210. This root_access signal may also be used to reset the secure domain protection flip-flop 210. In other words, the secure domain protection flip-flop may be reset whenever the integrated circuit 100 is not in test mode (as determined by the SCAN_TEST_EN signal) or when the operating domain 101 determines that access to the secure domain 102 is not allowed.

When the integrated circuit 100 enters test mode, as evidenced by a transition in the SCAN_TEST_EN signal, the clear input 213 to the secure domain protection flip-flop 210 is no longer asserted. However, the output of the secure domain protection flip-flop 210, labeled SCAN_TEST_EN SEC, is still deasserted. Thus, the output 231 of AND gate 230 transitions to an asserted state. The output 231 of the AND gate 230 also serves as the select signal for multiplexer 240. The select signal is used to select either the output of logic 250 that controls the functional reset for the secure domain 102, or the active reset state. In other words, when the output 231 is asserted, the output 241 of the multiplexer 240 is low and therefore resets all of the flip-flops in the secure domain 102. When the output 231 is deasserted, the reset of the secure domain 102 is controlled by logic 250.

Note that in this embodiment, the output 231 is asserted from the time that the SCAN_TEST_EN signal is asserted until the time that the SCAN_TST_UPD signal is asserted. This creates a pulse at the start of any scan test that ensures that the secure domain 102 is reset.

Figure 5:
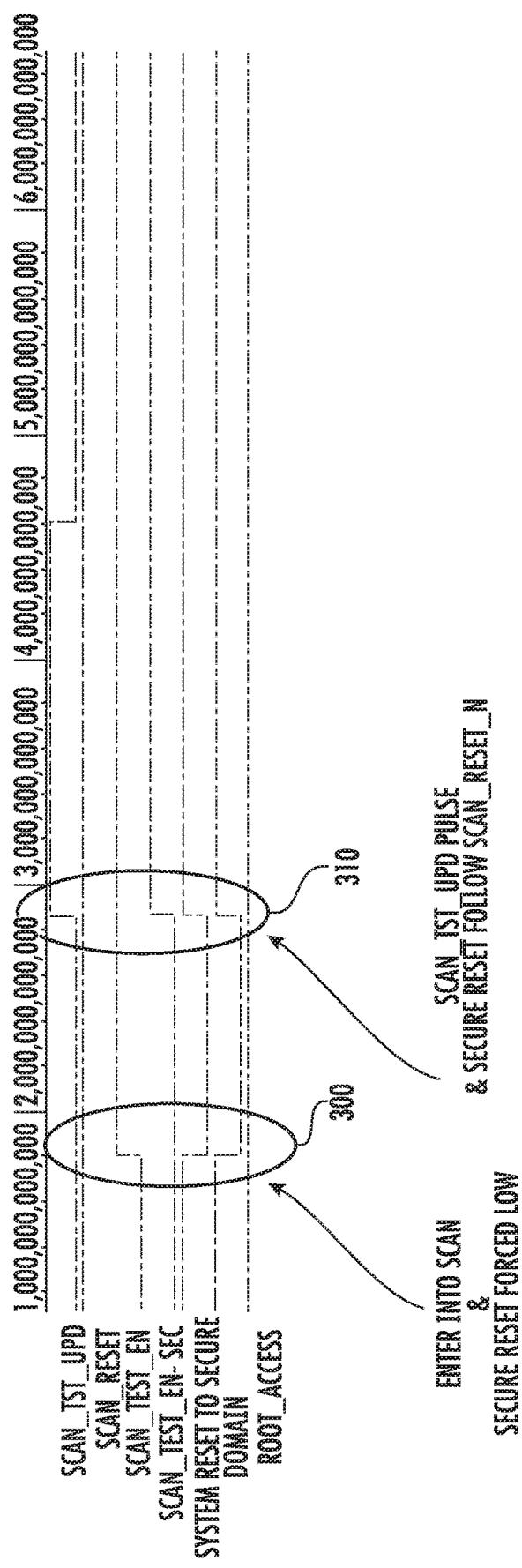
FIG. 5 shows a timing diagram showing the operation of the circuit of FIG. 4.

FIG. 5 shows a timing diagram showing the operation of secure scan management circuit 200. At time 300, the SCAN_TEST_EN signal is asserted. As described above, this may be set by an on-chip debugger using the SWD protocol. The assertion of SCAN_TEST_EN causes the clear input 213 to become deasserted. Further, the assertion of SCAN_TEST_EN causes the output 231 of the AND gate 230 to be asserted. This selects the ground input for multiplexer 240 and causes the output 241 of the multiplexer 254, which is the reset of the secure domain 102, to be asserted.

Note that this condition persists until either the clear input 213 is asserted again, or the output of secure domain protection flip-flop 210 becomes asserted. The assertion of the secure domain protection flip-flop 210 may be caused by the transition of the SCAN_TST_UPD. Thus, as shown in time 310, the SCAN_TST_UPD signal is asserted, causing the root access signal to be clocked into the secure domain protection flip-flop 210, causing its output, labeled SCAN_TEST_EN SEC, to be asserted. It is assumed that the secure root of trust is granted and hence the root_access signal is asserted. This assertion causes the output 231 of the AND gate 230 to be deasserted. This allows the reset of the secure domain 102 to again be controlled by logic 250.

At this time, the integrated circuit 100 may execute any desired test mode. Further, as explained above, the flip-flops in the secure domain 102 are all reset prior to executing this test mode.

Thus, in one embodiment, an integrated circuit 100 includes a SCAN_TEST_EN signal, which is asserted whenever it is desired to enter a test mode. The integrated circuit 100 also includes a scan configuration shift register 160 and a scan configuration shadow register 170. These registers are used to determine which type of test is to be performed and is configured after the SCAN_TEST_EN signal is asserted. The desired configuration is loaded into the scan configuration shadow register 170 by asserting an external connection, labeled SCAN_TST_UPD. This action loads the desired test mode into the scan configuration shadow register 170. Further, during the time interval between the assertion of the SCAN_TEST_EN signal and the assertion of the SCAN_TST_UPD signal, the flip-flops in the secure domain 102 of the integrated circuit 100 are held in a reset state. This ensures that no confidential or proprietary data can be scanned from the integrated circuit 100.

While the above description discloses a specific embodiment where the SCAN_TEST_EN signal is generated internally, other embodiments are also possible. For example, the SCAN_TEST_signal may be an external connection.

Further, the present disclosure describes a scan configuration shift register and a scan configuration shadow register 170 to load the desired scan mode. However, it is noted that this functionality is not required in all embodiments. For example, the use of two signals (i.e. SCAN_TEST_EN and SCAN_TST-UPD) to create a pulse that is used to reset the circuitry in the secure domain 102 may be performed without the need for a scan configuration circuit 150. In other words, one signal, such as SCAN_TEST_EN may be used to initiate the reset of all flip-flops in the secure domain 102 and the second signal, such as SCAN_TST_UPD, may be used to terminate the reset of all flip-flops in the secure domain 102.

This system and method have many advantages.

First, this invention defines a delayed reset mechanism where the scan mode entry from any method (whether legal or forced) will generate an asynchronous reset to all the secure logic in the integrated circuit. Hence, just after entry into scan mode, the secure logic will be reset and remain in reset state until any of the scan mode configurations are set. This implies that even immediately after scan mode entry, if a hacker issues scan shift out by toggling random/correct GPIOs, the delayed reset is already asserted. Thus, the data shifted out will consist of a plurality of zeros through the scan chains. In this way, a hacker cannot get access to any secure information inside the integrated circuit.

Second, often, there are software sequences to skip reading sensitive information during scan mode. These software sequences are often packable and can lead to security breaches. As stated above, the present system and method does not rely on a software sequence. Rather, the flip-flops in the secure domain 102 are all reset when scan test is entered. Thus, the present system cannot be hacked by any method to enter into scan mode since the architecture is hardware based and is independent of the method employed to gain access to the scan mode within the integrated circuit. This guarantees that no sensitive data can be extracted during the scan mode. Further, since special software sequences are not used, the present system has minimal area overhead in terms of DFT logic as well as no special software/firmware sequencing needed.

Third, the reset for the secure domain 102 can be distributed to all flip-flops in the secure domain 102. In other words, the flip-flops in the secure domain 102 can be disposed in the same scan chains as other flip-flops from the operating domain 101. There is no need to partition the flip-flops in the secure domain 102 in a separate scan chain. Some existing systems utilize separate scan chains for the secure domain and the operating domain. However, having separate secure and non-secure scan chains leads to unbalanced scan chains in terms of number of flip flops per scan chain, which leads to more test time. As stated above, the present system and method imposes no such restriction since the mixing the secure and non-secure logic within a scan chain is easily supported. Thus, the present system is more efficient in terms of die area than existing systems.

Fourth, the scan mode entry is glitch protected. Thus, it does not allow a hacker to glitch the scan mode entry register bit to gain illegal scan access to the contents of the integrated circuit. The glitch protection is implemented with a concept of lock-step mechanism to mimic the root access across several glitch resistant flip-flops. These flip-flops are kept out of scan to maintain root mode throughout the scan mode.

Finally, the above system allows checks for manufacturing faults over the entirety of the integrated circuit. The secure domain is not excluded from this testing.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. An integrated circuit, comprising:
   a secure domain, comprising flip-flops that contain confidential or proprietary information,
   a scan configuration circuit that selects a desired test mode configuration;
   a SCAN_TEST_EN signal that denotes that the integrated circuit is in a test mode;
   a SCAN_TST_UPD signal that is used to store the desired test mode configuration in the scan configuration circuit; and
   a secure domain protection circuit, wherein the secure domain protection circuit issues a reset to the flip-flops in the secure domain during a time interval between an assertion of the SCAN_TEST_EN signal and an assertion of the SCAN_TST_UPD signal.

2. The integrated circuit of claim 1, wherein the assertion of the SCAN_TEST_EN signal causes the secure domain protection circuit to issue the reset.

3. The integrated circuit of claim 1, wherein the assertion of the SCAN_TST_UPD signal causes the secure domain protection circuit to terminate the reset.

4. The integrated circuit of claim 1, wherein the SCAN_TST_UPD signal is an external connection.

5. The integrated circuit of claim 1, wherein the scan configuration circuit comprises a scan configuration shift register and a scan configuration shadow register, wherein the SCAN_TEST_UPD signal is used to clock data from the scan configuration shift register to the scan configuration shadow register.

6. The integrated circuit of claim 5, further comprising a SCAN_IN signal and a SCAN_CLK signal, wherein data is input to the scan configuration shift register via the SCAN_IN signal and the data is clocked into the scan configuration shift register by the SCAN_CLK signal.

7. The integrated circuit of claim 5, wherein the scan configuration shift register has a plurality of shift register flip-flops and the scan configuration shadow register comprises the same plurality of shadow register flip-flops, wherein an output of each of the plurality of shift register flip-flops is an input to a corresponding shadow register flip-flop.

8. The integrated circuit of claim 1, wherein the reset is issued asynchronously.

9. A method of performing a secure scan test of the integrated circuit of claim 1; the method comprising: asserting the SCAN_TEST_EN signal to place the integrated circuit in the test mode, wherein the assertion of the SCAN_TEST_EN issues the reset to the flip-flops in the secure domain; inputting the desired test mode by presenting data to the integrated circuit; storing the desired test mode in the scan configuration circuit by asserting the SCAN_TST_UPD signal, wherein the assertion of the SCAN_TST_UPD signal also terminates the reset to the flip-flops in the secure domain; and performing the scan test after the desired test mode is stored.

10. The method of claim 9, wherein the scan configuration circuit comprises a scan configuration shift register and a scan configuration shadow register, and the desired test mode is input by presenting the data via a SCAN_IN signal and pulsing a SCAN_CLK signal to shift the data into the scan configuration shift register; and wherein asserting the SCAN_TST_UPD signal clocks data from the scan configuration shift register to the scan configuration shadow register.

11. The method of claim 9, wherein the SCAN_TEST_EN signal is an output of an internal flip-flop and is asserted using single wire debug (SWD) mode or JTAG/IJTAG mode.

12. An integrated circuit, comprising:
a secure domain, comprising flip-flops that contain confidential or proprietary information,
a first signal that denotes that the integrated circuit is in a test mode;
a second signal, wherein the second signal is used to capture a mode of testing to be performed; and
a secure domain protection circuit, wherein the secure domain protection circuit issues a reset to the flip-flops in the secure domain during a time interval between an assertion of the first signal and an assertion of the second signal.

13. The integrated circuit of claim 12, wherein the assertion of the first signal causes the secure domain protection circuit to issue the reset.

14. The integrated circuit of claim 12, wherein the assertion of the second signal causes the secure domain protection circuit to terminate the reset.

15. The integrated circuit of claim 12, wherein testing cannot be performed until after the assertion of the second signal.

16. The integrated circuit of claim 12, wherein the second signal comprises an external connection.

17. The integrated circuit of claim 12, wherein the first signal is an output of an internal flip-flop.

18. The integrated circuit of claim 17, wherein the internal flip-flop is set by an on-chip debugger using single wire debug (SWD) mode.

19. The integrated circuit of claim 12, wherein the first signal comprises an external connection.

* * * * *